United States Patent [19]

Shook

[11] 4,437,596

[45] Mar. 20, 1984

[54] ASSEMBLY FOR MOUNTING A WATER BOTTLE CAGE ON A CYCLE FRAME

[75] Inventor: William B. Shook, Bremen, Ohio

[73] Assignee: Thurston, Inc., Columbus, Ohio

[21] Appl. No.: 398,663

[22] Filed: Jul. 15, 1982

[51] Int. Cl.³ .............................................. B62J 11/00
[52] U.S. Cl. .................... 224/39; 224/32 R; 248/231
[58] Field of Search ............... 224/30 R, 30 A, 32 A, 224/35, 36, 37, 148, 39; 248/218.4, 219.4, 227.1, 229, 231; 403/391, 396; 280/289 A

[56] References Cited

U.S. PATENT DOCUMENTS

| 575,857 | 1/1897 | Sly . | |
|---|---|---|---|
| 1,090,929 | 3/1914 | McFadden . | |
| 1,288,153 | 12/1918 | Otte . | |
| 1,328,930 | 1/1920 | Stern . | |
| 2,840,287 | 6/1958 | Stevens | 224/35 |
| 3,434,682 | 3/1969 | Nestlerode, Sr. | 248/68 |
| 3,522,960 | 8/1970 | Moore | 287/54 |
| 3,777,955 | 12/1973 | Davies | 224/35 |
| 3,893,647 | 7/1975 | Kennedy | 248/68 |
| 4,009,810 | 3/1977 | Shook | 224/32 R X |
| 4,142,813 | 3/1979 | Laborde | 403/391 |
| 4,244,235 | 1/1981 | Yoshikawa | 248/231 X |
| 4,339,060 | 7/1982 | Braida, Jr. | 224/39 X |
| 4,386,721 | 6/1983 | Shimano | 224/39 |

*Primary Examiner*—Steven M. Pollard
*Attorney, Agent, or Firm*—William V. Miller

[57] ABSTRACT

A wire bottle cage, which has an insert open end and a closed or stop end with a back formed of laterally-spaced longitudinally-extending wires with a bumper and guide at the front and a catch and guide at the back which serve to cause the corner, at the bottom of the bottle, to slide along the back wires as it is inserted into or removed from the cage, along with special mounting means to attach the cage to a cycle bar or similar support in such a manner as not to interfere with the sliding action of the bottle on the back wires and to positively lock the cage in place on the bar.

8 Claims, 11 Drawing Figures

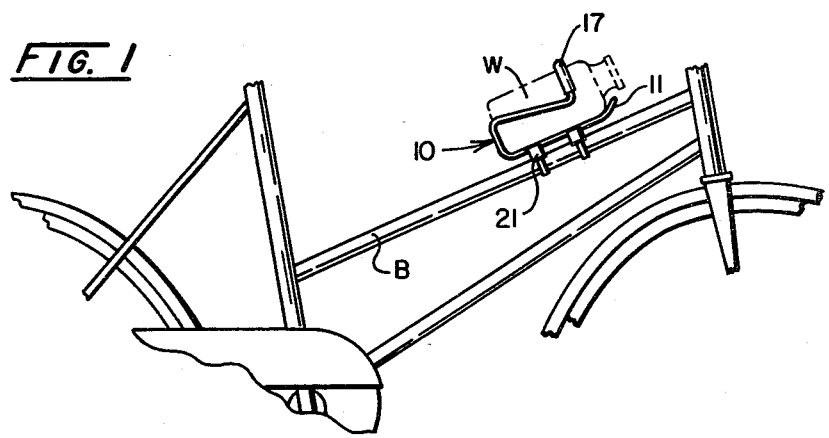
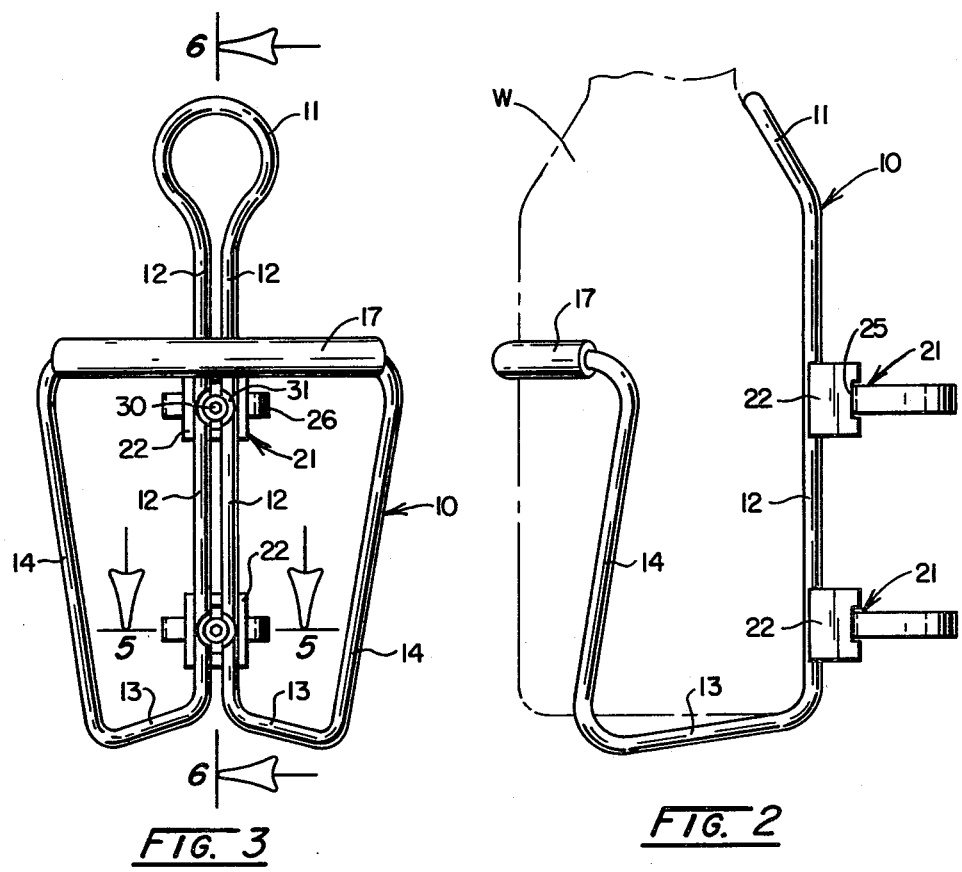

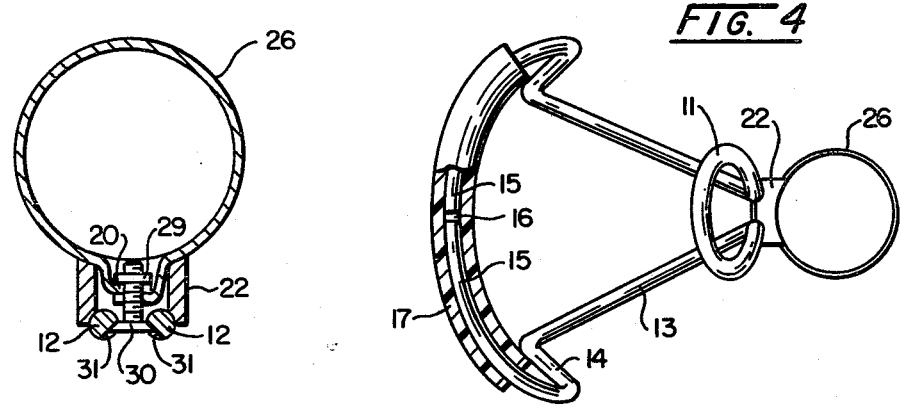
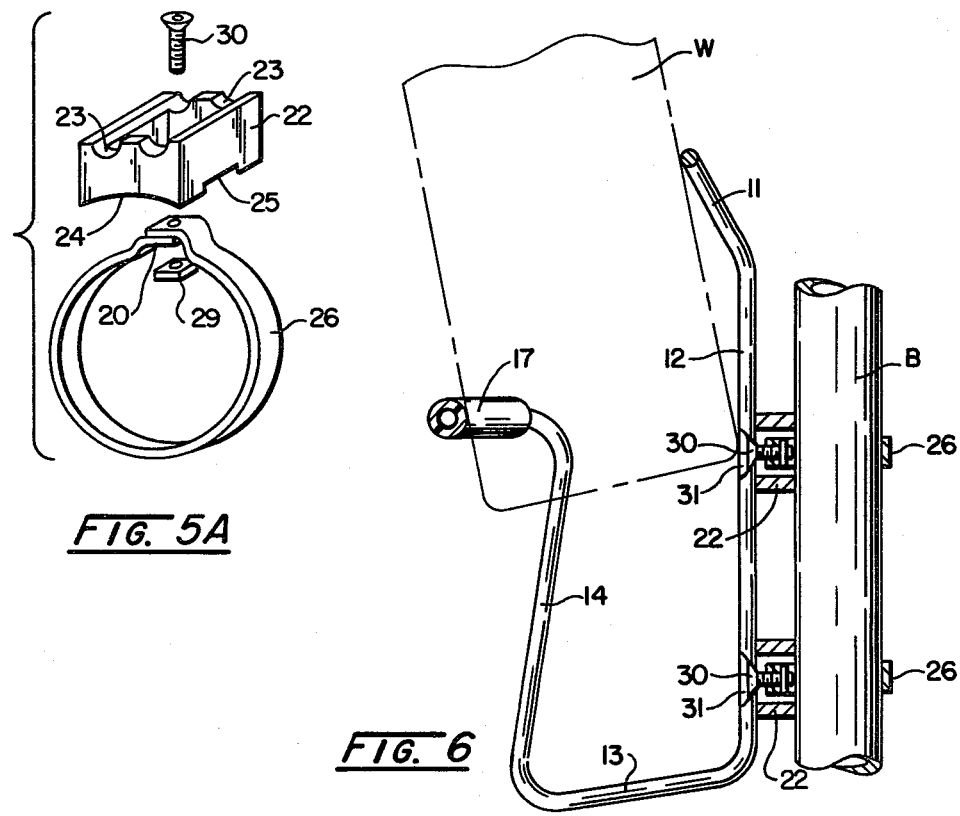

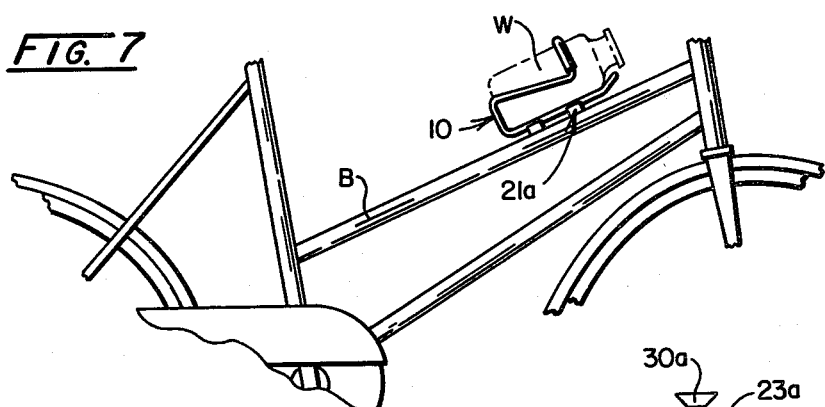
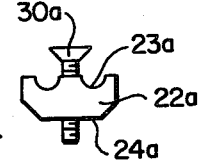
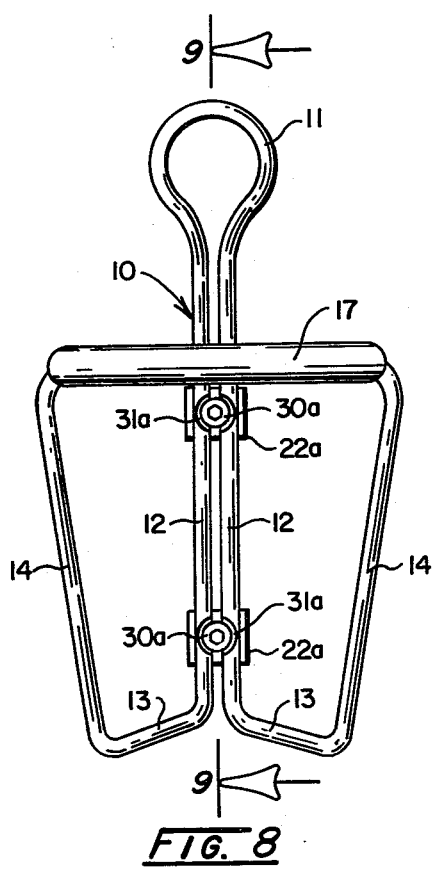
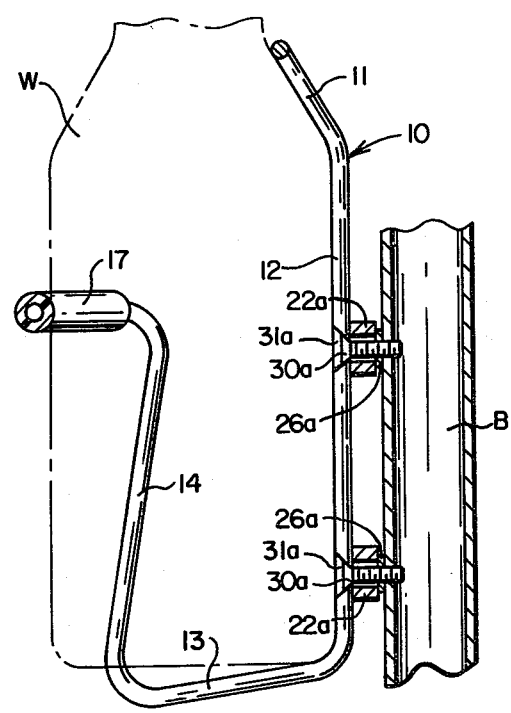

ASSEMBLY FOR MOUNTING A WATER BOTTLE CAGE ON A CYCLE FRAME

BACKGROUND OF THE INVENTION

This invention relates to the mounting of a water bottle cage or the like on the tube of a cycle frame or similar member. It deals mainly with the mounting of a water bottle cage of the general type disclosed in U.S. Pat. No. 4,009,180, issued Mar. 1, 1977 which was made of aluminum wire to reduce weight. This cage was mounted without welding, soldering or clamping but did not provide for complete clearance of the mounting means by the bottle as it was slid into and out of the cage. The purpose of this present invention is to allow clamping of the wires of the cage without interference with the bottle. It is desirable that the water bottle, or other object placed in the cage slide in-and-out along the length of the wires of the cage without interference with any part of the mounting assembly.

Other methods in use, in addition to that disclosed in the above-indicated patent, have included welding the aluminum wires onto an aluminum plate, then fastening the plate with straps or bolts to the frame, thereby leaving the wires straight and clear with no obstacles for the bottle to contact as it slides into position, or crimping the aluminum wire toward the frame in the region of a mounting bracket, thus allowing the offset bracket to be cleared by the bottle as the bottle is slid into carrying position. Problems arise with both of these methods in connection with the fatigue breakage of high-strength aluminum alloys, either at the weld or at the crimping where the prestress is in an unfavorable direction.

SUMMARY OF THE INVENTION

The mounting assembly for the water bottle cage, according to the present invention, includes longitudinally-spaced cradle blocks which receive and cradle longitudinally-extending wires of the cage. The wires are held in the cradles of the blocks by the heads of screws that pass into the blocks, which clamp the wires at a level below their surfaces sufficiently low for the bottle to clear the screw heads as it is inserted into or removed from the cage. The cradling or mounting blocks receive the wires and the screws not only hold the wires in the blocks but aid in securing the blocks to the bicycle frame.

BRIEF DESCRIPTION OF THE DRAWINGS

The best mode contemplated in carrying out this invention is illustrated in the accompanying drawings in which:

FIG. 1 is a schematic view illustrating a water bottle cage mounted on a cycle frame by one form of mounting assembly embodying this invention;

FIG. 2 is a side view of the cage and mounting assembly with the bottle shown schematically in place;

FIG. 3 is a face elevational view of the empty cage which is held on the mounting assembly;

FIG. 4 is an elevational view, partly broken away, of the bottle-receiving end of the cage;

FIG. 5 is an enlarged transverse sectional view taken along line 5—5 of FIG. 3;

FIG. 5a is a perspective view of the disassembled parts used in the mounting assembly of FIG. 1.;

FIG. 6 is a longitudinal sectional view taken along line 6—6 of FIG. 3 but showing the cage mounted on the cycle frame and also schematically showing the bottle being inserted in the cage;

FIG. 7 is a view similar to FIG. 1 but showing another form of mounting assembly embodying this invention;

FIG. 8 is a face elevational view of the cage with the mounting illustrated in FIG. 7; and FIG. 8a is an end elevational view of the mounting assembly of FIG. 7;

FIG. 9 is a longitudinal sectional view taken along line 9—9 of FIG. 8 but showing the cage mounted on the cycle frame.

DETAILED DESCRIPTION OF THE INVENTION

With reference to the drawings, in FIGS. 1 and 7 the present invention is shown as a mounting assembly used in mounting a cage 10 for receiving a water bottle W or the like on a bar B of a bicycle frame. Two examples of mounting assemblies are indicated in the drawings, the one in FIG. 1 being designated generally by the numeral 21 and the one in FIG. 7 being designated generally by the numeral 21a.

The cage itself is substantially like that shown in U.S. Pat. No. 4,009,810, being formed of a single piece of aluminum wire to provide a socket for receiving the bottle W. This socket includes an inverted U back which has an upper retainer or catch 11 of loop or eye form which is angled forwardly. Extending longitudinally from the catch or loop 11 are the straight wire sections 12 which are arranged in close longitudinally-extending parallel relationship and form most of the back of the socket. Sections 12 have outwardly or forwardly extending and slightly incined arms 13 which diverge laterally. Extending from the arms 13 and inclined backwardly slighlty toward sections 12 is an inverted U-form front portion of lesser extent than wire sections 12 and consisting of the wire sections 14. These sections 14 join with the transversely inwardly extending wire ends 15 which almost meet at a joint 16, the arms 15 bowing forwardly in an outwardly curving arc. Thus, the one piece of wire of circular cross-section is bent to form the socket for the water bottle W with the transversely disposed ends meeting at the joint 16. To connect these ends without soldering or welding, a plastic or rubber tube section 17 is used which is forced over the adjacent ends 15, fitting tightly thereon to firmly connect the adjacent ends and bridging the joint 16.

Each mounting assembly 21 or 21a consists of longitudinally-spaced cradle blocks which receive and cradle the longitudinally-extending parallel wire sections 12 of the wire cage 10 which are held therein by the heads of screws that pass into the blocks and which have their heads countersunk into the wire sections to be below their surfaces so that the lower corner of the bottle clears the screws as it is inserted into or removed from the socket. The screws not only hold the wire sections in the cradling blocks but also aid in securing the blocks to the cycle bar B.

The mounting assembly 21 shown in FIGS. 1–6 consists of a pair of longitudinally-spaced wire cradling blocks 22. Each block is preferably of aluminum and of square form and hollow. The opposite end of each block is provided in each of the opposed sides of its upper edge with a pair of laterally-spaced wire-receiving arcuate cradling notches 23 for receiving the cylindrical wire sections. Each block is provided on each of the other sides at its lower edge with a curved yoke formation 24 to fit the curvature of the cycle bar B. Also, the two lower edges of the block at right angles to the curved lower edges 24 are provided with strap-receiving angular notches 25 which are adapted to receive the fastening straps 26 which are preferably of steel and are adapted to pass around the bar B and have screw-passing openings in their extremities. For tightening each strap and securing each block 22 to the bar B as well as to hold the cage wire sections 12 in the cradling notches 23 in the associated block, a screw and nut arrangement, preferably of steel, is provided which includes the screw 30 and nut 29. The ends of each strap 26 are provided with angular bends 28 which overlap to provide a square socket for receiving the square nut 29 and preventing rotation thereof when the screw 30 is threaded into the nut in applying each strap on the bar B but other connecting arrangements may be provided for the straps.

Two of the blocks 22 with cooperating straps 26 and associated screws 30 and nuts 29 are used in mounting each wire cage 10 on the cycle bar B or other support. To receive the flat frusto-conical heads of the screws, the wire sections 12 are provided with countersink sockets at longitudinally spaced positions, each of which is formed of opposed tapered inwardly-opening notches 31 formed in the respective inner edges of the longitudinally-extending spaced parallel wire sections. Each notch is concentric to the curvature of the flat head of the screw.

In positioning the blocks 22 on the cycle bar B, the straps 26 are placed around the bar and their angular ends 28 are overlapped with the square units 29 positioned in the respective sockets provided thereby on the bar surface. The two screws 30 are positioned with their heads in the two countersinks provided by the opposed notches in wire sections 12 and the screws are then started in the underlying nuts 29, after passing through the openings in the strap extremities. Tightening each screw in its nut will not only clamp the strap to the cycle bar B but will also clamp the wire sections 12 in the cradling notches 23 of the block 22 and clamp the yoke surface 24 of the block to the complemental curved surface of the cycle bar. During this tightening action, nuts 29 will not turn and when the action is completed, the flat heads of the screws 30 will be countersunk in the wire sections 12 at the longitudinally-spaced countersink sockets provided by the pair of opposed arcuate tapering notches 31. Thus, the outer flat surfaces of the screw heads will be below the outermost surfaces of the wire sections 12. No modification of the cycle bar is required with this mounting assembly.

With this arrangement, as indicated in FIG. 6, the bottle 12 will be guided into sliding contact with the wire sections 12 by catch 11 and bumper 17, but the corner C of the bottle will not contact the heads of screws 30, as the bottle is slid into or out of the cage 10, because the heads will be below the surfaces of the wire sections 12 on which the bottle slides. The countersink notches 31 in the wire sections 12 also serve to prevent longitudinally sliding of the cage 10 on the blocks 22 of its mounting assembly and torsional movement relative thereto.

In FIGS. 7 and 9, a different mounting arrangement is illustrated but this still employs a pair of cradling blocks 22a which receive the cage wire sections 12 and which are disposed at two longitudinally spaced positions therealong as before. Each block 22a has a pair of parallel arcuate cradling notches or grooves 23a extending its length for receiving the parallel cylindrical wire sections 12. Each block also has an opposed surface 24a for engaging a nut 26a brazed to the cycle bar B over a screw-receiving opening. A screw 30a is passed through each block 22a and nut 26a to clamp the block in position on the bar and to clamp the wire sections 12 in the block 22a.

Countersink notches 31a are provided in the wire sections 12, as before, to provide longitudinally-spaced countersink sockets for receiving the flat heads of the screws 30a. As indicated in FIG. 9, this arrangement also does not interfere with the sliding in and out of the bottle W, relative to the socket of wire cage 10, along the wire sections 12. It also prevents longitudinal and torsional movement of the cage W relative to the mounting blocks 22a and bar B.

It will be apparent that there is thus provided a wire bottle cage, which has an insert open end and a closed or stop end with a back formed of laterally-spaced longitudinally-extending wires with a bumper and guide at the front and a catch and guide at the back which serve to cause the corner, at the bottom of the bottle, to slide along the longitudinally-extending, laterally-spaced back wires as it is inserted into or removed from the cage, along with special mounting means to attach the cage to a cycle bar or similar support in such a manner as not to interfere with the sliding action of the bottle on the back wires. The mounting means also precludes relative longitudinal or twisting movement of the cage by positively locking it in place on the bar.

I claim:

1. A wire cage for receiving a bottle or the like in combination with an assembly for mounting it on a support; said wire cage being formed with a socket into which the bottle is inserted and removed therefrom and including longitudinally-extending back wire sections along which the bottle slides during insert and removal; said mounting assembly including a cradling block for receiving the wire sections, and fastening means for fastening the block to the support and engaging the wire sections rearwardly of the forwardmost surfaces thereof so as to clamp the wire sections to the block in a manner not to interfere with the sliding movement of the bottle thereon; said back wire sections being disposed in laterally-spaced relationship, said fastening means of the mounting assembly comprising a screw which is passed between the back wire sections through the block and which has a clamping head for engaging the wire sections, said wire sections being provided with opposed notches to form a countersink socket for the screw head so it will be below the surfaces of the wire sections engaged by said bottled and will also preclude longitudinal and torsional movement of the wire sections relative to the cradling block.

2. The combination of claim 1 in which a plurality of the mounting assemblies are disposed at longitudinally-spaced positions along the wire sections.

3. The combination of claim 2 in which each block is provided with a surface which is complemental to the support surface against which it is clamped.

4. The combination of claim 2 in which each mounting assembly includes a strap to pass around a support bar or the like, said strap having overlapping perforated ends disposed in said block which is hollow, said screw passing through said ends and receiving a nut threaded thereon.

5. The combination of claim 4 in which the overlapping ends of the strap are angular to form a square socket for receiving a square nut on the screw so it will not turn as the screw is threaded thereinto.

6. The combination of claim 5 in which the block is hollow and of square form with cradling notches in its upper edges at two sides and curved bar engaging edges at those sides, the lower edges of the other two sides having strap-receiving notches formed therein.

7. The combination of claim 2 in which each screw is tapped into a nut on the support.

8. The combination of claim 7 in which each block has cradling grooves in its upper surface for receiving the wire sections and a flat nut-engaging lower surface.

* * * * *